Patented June 10, 1952

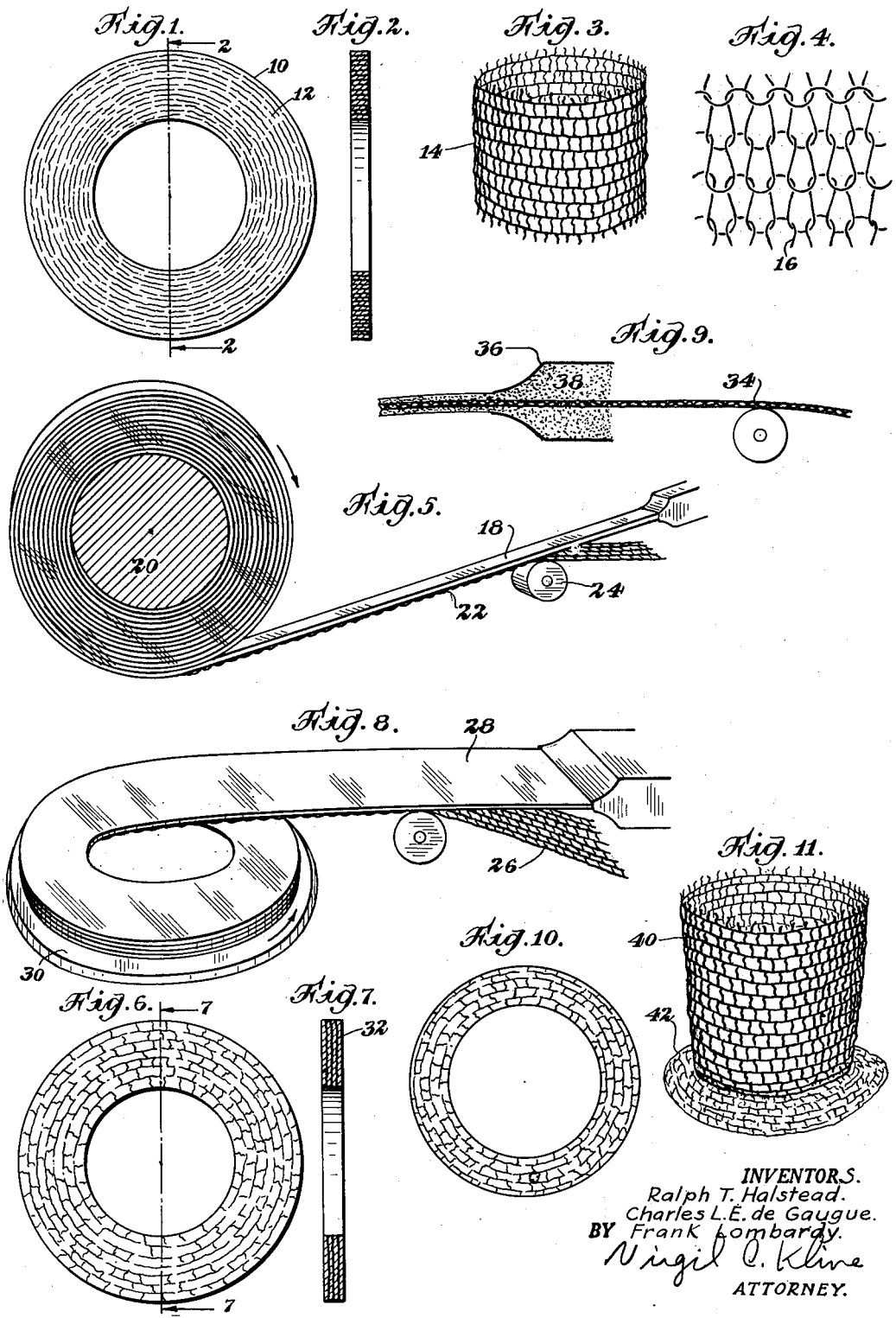

2,599,826

UNITED STATES PATENT OFFICE 2,599,826

REINFORCED FRICTION FACING

Ralph T. Halstead, Charles L. E. de Gaugue, and Frank Lombardy, Somerville, N. J., assignor to Johns-Manville Corporation, New York, N. Y., a corporation of New York Application December 6, 1946, Serial No. 714,630

6 Claims. (Cl. 192—107)

1

The instant invention relates to friction materials and, more particularly, to an improved annular facing for clutches and the like.

A principal object of the invention is the provision of a facing which is of high spin strength, the term "spin strength" being used herein with reference to the ability of an annulus to resist disintegration or distortion under the centrifugal forces created when it is rotated at high speed. Excessive rotational speeds of clutch facings at times must be expected, particularly in the automotive field, and it is essential that the facing have a sufficiently high spin strength to prevent failure under such conditions. A facing in accordance with the invention is given this property through the inclusion of resilient reinforcing means embedded in the body of the facing, the reinforcing means yieldably resisting disintegrating forces.

Another object of the invention is the provision of a clutch facing or the like made up of a main body of a friction compound, suitably of any conventional type, and rings or spirals of resilient, metallic fabric embedded in the body. A fabric found most suitable for this purpose is a knitted metal mesh, preferably of the circular knit type, which is compacted and embedded in the friction compound during a conventional molding operation.

The invention may take different specific forms and the metal mesh may be introduced by involutely winding it with a ribbon of the friction compound to form a rough annulus which is then molded to embed the mesh and to form the facing. Alternatively, a ribbon of the metal mesh and a ribbon of the friction compound may be helically wound to form the rough annulus. Also, among other methods, a tubularly knitted fabric may be wound on itself to form an annulus and this then impregnated with a dry or wet mix of the friction compound and molded as before.

The specific manner in which the invention is carried out in any of the several forms, and further objects and advantages thereof will be apparent when reference is made to the more detailed description which is to follow and to the accompanying drawings in which:

Fig. 1 is a plan view of a friction facing in accordance with an embodiment of the invention;

Fig. 2 is a sectional view taken on the line 2—2 of Fig. 1;

2

Fig. 3 is a perspective view of a tubular stocking or sleeve of knitted fabric;

Fig. 4 is an enlarged, diagrammatic view of the metal fabric shown in Fig. 3;

Fig. 5 is a diagrammatic view illustrating steps in the method of forming the facing of Figs. 1 and 2;

Fig. 6 is a view similar to Fig. 1 illustrating a modified form of the facing;

Fig. 7 is a sectional view taken on the line 7—7 of Fig. 6;

Fig. 8 is a view similar to Fig. 5 illustrating steps in the method of forming the modified facing;

Fig. 9 is a view of a further modification which may be employed in the methods of either Fig. 5 or 8;

Fig. 10 is a view similar to Figs. 1 and 6 of a further modification of the facing; and, Fig. 11 is a diagrammatic view illustrating the manner of preparing the knitted metal mesh fabric in the manufacture of the facing of Fig. 10.

Referring now to the drawings and first to Figs. 1 to 5 inclusive, a facing in accordance with the invention comprises an annulus or annular disc of a cured or hardened friction compound 10 and an embedded, resilient, metal mesh fabric 12. The particular compound employed is not critical to the instant invention and any of the conventional materials, either rubber-bonded, resin bonded, or modifications thereof, may be used. For example, a compound having the following composition has been found to be suitable in the preparation of a commercial facing.

| | Parts |
|---|---|
| Asbestos fiber | 39 |
| Thermo-setting resin | 4 |
| Buna S rubber | 8 |
| Sulphur | 4 |
| Friction particles | 45 |

In the above formula, which is only illustrative and in no way limiting, the thermo-setting resin may be of any suitable type, such as Bakelite. The friction particles are also conventional, these being finely ground particles of hard rubber, coal, or the like. The compound may also include conventional fillers, such as carbon black, zinc oxide, lead oxide and others.

The fabric 12 which serves as the reinforcing element, is as illustrated particularly in Figs. 3 and 4, preferably in the form of a continuous knitted stocking or sleeve 14, such as produced on a conventional circular knitting machine. The knitting strands 16 are fine wires or ribbons, round wires being preferred, of a metal such as brass or copper. In lieu of the particular circular knit material shown, other knitted or netted, resilient fabrics may be used.

In constructing the facing of Figs. 1 and 2, the selected friction compounds, such as the compound given above, is properly mixed and then extruded in the form of a relatively thin, narrow ribbon 18 which is wound up to form a coil on a mandrel 20. Simultaneously with the extrusion of the ribbon 18, a ribbon or flattened tube 22 of the knitted metallic fabric is fed from a suitable supply (not shown) over idler roll 24, and into contact with the ribbon 18, and is rolled up therewith on the mandrel 20, the two ribbons forming a rough annulus composed of alternate layers of the friction stock and the metallic mesh with the latter extending substantially from face to face of the annulus as best shown in Fig. 2. When the annulus has reached the proper diameter the ribbons are cut and the annulus is placed in the conventional manner in a mold or form, and is subjected to heat and pressure to fashion or shape it into the form of a clutch disc and to cure the binder elements of the composition. Thereafter, the disc is ground to give it the necessary smooth finished friction faces, the grinding exposing the metal mesh to some extent at such faces, as diagrammatically illustrated in Fig. 1.

During the molding or shaping operation, the knitted mesh is thoroughly embedded in the compound so that it forms an internal reinforcement which resists the tendency of the hardened compound to disintegrate or break up under the influence of the centrifugal forces set up on high speed rotation of the facing. Due to the resilient characteristics of the knitted fabric used as the reinforcement, some beneficial yielding is permitted, but not to the extent that the compound fractures or becomes unduly weakened. The metal mesh, in addition, supplements the action of the friction particles in the compound and enhances the wearing qualities of the facing.

Referring now particularly to Figs. 6, 7 and 8, a facing having similar properties is illustrated which, however, is made in a somewhat different manner. In this construction alternate layers of the metallic mesh and the friction stock, which may be either a dry or extruded stock, are laid in the form of a helix on a table or plate 30 rotating in a horizontal plane (see Fig. 8). The metal mesh fabric 26 is fed, as before, from a suitable supply into contact with the ribbon 28 of the stock which, as stated above, may be either an extruded stock, as shown, or a dry mix, and the ribbons are wound into a helix. The helix is then placed in a mold for shaping and for curing of the binder ingredients in the conventional manner. After sanding and other finishing operations, which are the same as those employed above, a facing as illustrated in Figs. 6 and 7 is obtained with the metal mesh lying in a plurality of layers 32 extending parallel to the flat surfaces of the facing.

In either of the methods described above, in lieu of forming separate ribbons of the metal mesh, and the friction stock, the friction stock may be extruded around the metal mesh, as illustrated in Fig. 9. In this embodiment the metal mesh, shown at 34, is fed from a suitable supply through the extension nozzle 36, the friction stock 38 forming layers on opposite sides of the metal mesh, and also impregnating the mesh as it leaves the nozzle. The ribbon made up of the combined metal mesh and the friction stock may be wound into a rough annulus by the methods of either Fig. 5 or 8. As will be appreciated, in all the methods described above the ribbons of stock and of the metal mesh are made of sufficient width to give a rough annulus of the required dimensions so that when molded and sanded it will form a finished facing of the character desired.

Figs. 10 and 11 illustrate a further modification. In this case a tubular sleeve 40 of the knitted mesh is wound on itself to form an annulus 42. This is then impregnated with the friction compound in either a dry or wet state and the composite is molded and finished as before to produce the facing of Fig. 10.

In each of the several forms of the invention the knitted metal fabric is distributed throughout the facing to provide adequate reinforcement against the stresses tending to distort or shatter the facing. The mesh may be used in various proportions relatively to the friction composition, depending upon the particular results to be obtained. For purposes of example, it has been found that employing a knitted mesh of 70–30 brass wire in a proportion of 8–20% of the total weight of the composite has provided satisfactory reinforcement of the facing.

Having thus described our invention in rather full detail, it will be understood that these details need not be strictly adhered to and that various changes and modifications may suggest themselves to one skilled in the art, all falling within the scope of the invention as defined by the subjoined claims.

What we claim is:

1. A friction facing comprising an annular body of a hardened friction compound and annular rings of knitted metal fabric embedded therein and forming a reinforcing body distributed substantially throughout the compound and substantially exposed on the opposite faces thereof.

2. A friction facing comprising a body composed of annular layers of a hardened friction compound and knitted metal mesh interposed between and embedded in said layers and forming a reinforcing body distributed substantially throughout the compound and substantially exposed on the faces thereof.

3. A friction facing comprising an annular body composed of a hardened friction compound and a knitted metal mesh in the form of a coil embedded therein and distributed substantially throughout the compound, the metal mesh being substantially exposed on the opposite faces of the body.

4. A friction facing comprising an annular body of hardened friction compound and a knitted metal mesh in the form of a helix embedded therein and forming a reinforcing body distributed substantially throughout the compound and substantially exposed on the opposite faces thereof.

5. A friction facing comprising an annulus composed of a hardened friction compound and an annular, multilayer continuous ring of knitted metal mesh embedded therein and distributed therethroughout, said mesh forming a reinforcing body and being substantially exposed on the opposite faces of the annulus.

6. A body adapted to be rotated at high speed comprising a hardened composition and a knitted metal mesh comprising a series of connected loops knitted with a metallic filament, said knitted mesh being embedded in said composition and distributed throughout said body so as to form a reinforcing structure imparting to said body a high spin strength.

RALPH T. HALSTEAD.
    CHARLES L. E. DE GAUGUE.
    FRANK LOMBARDY.

REFERENCES CITED

The following references are of record in the file of this patent:

UNITED STATES PATENTS

| Number | Name | Date |
|---|---|---|
| 1,626,403 | Gatke | Apr. 26, 1927 |
| 1,638,012 | Hoof | Aug. 9, 1927 |
| 1,771,749 | Eisenhardt | July 29, 1930 |
| 1,865,327 | McCain | June 28, 1932 |
| 2,175,399 | Judd | Oct. 10, 1939 |
| 2,196,569 | Stroehla et al. | Apr. 9, 1940 |
| 2,258,237 | Bockins et al. | Oct. 7, 1941 |
| 2,277,107 | Imes | Mar. 24, 1942 |
| 2,317,452 | Goodloe | Apr. 27, 1943 |
| 2,354,389 | Lidkea | July 25, 1944 |
| 2,393,496 | Stedman | Jan. 22, 1946 |